Nov. 25, 1941.   O. JENSEN   2,264,178
VARIABLE SPEED DEVICE
Original Filed Jan. 21, 1939   2 Sheets-Sheet 1

INVENTOR.
Ole Jensen
BY Rasmussen and Brugman
ATTORNEYS.

Nov. 25, 1941.　　　O. JENSEN　　　2,264,178
VARIABLE SPEED DEVICE
Original Filed Jan. 21, 1939　　2 Sheets-Sheet 2
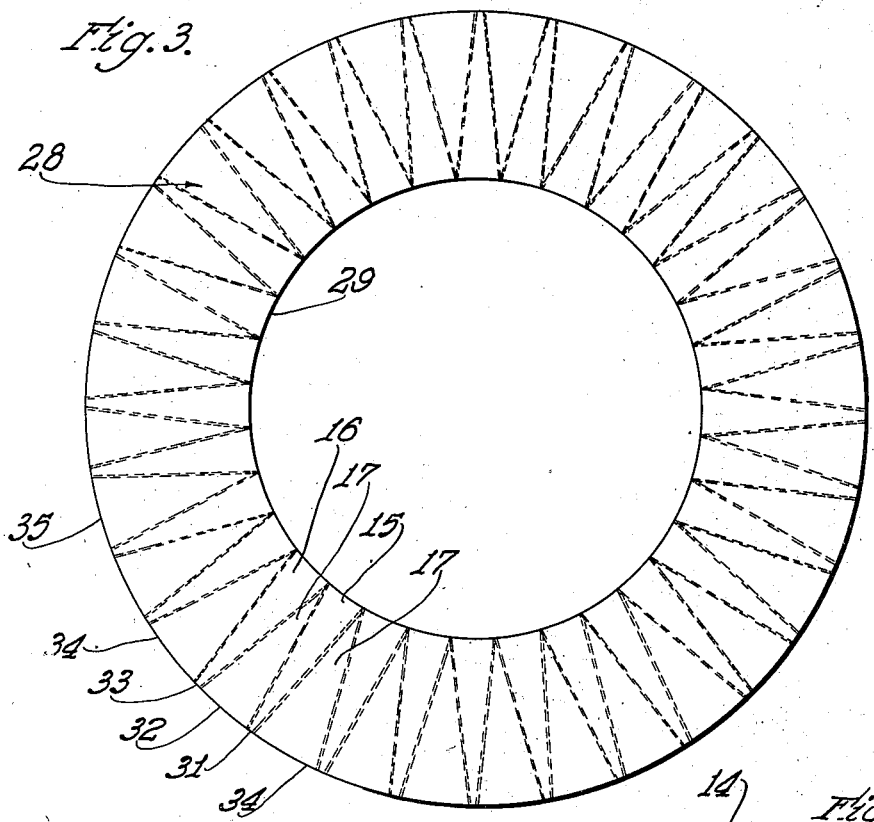
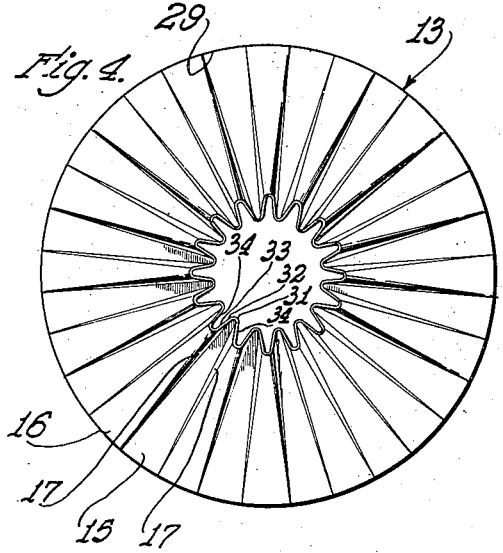
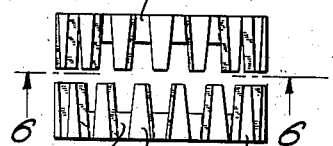
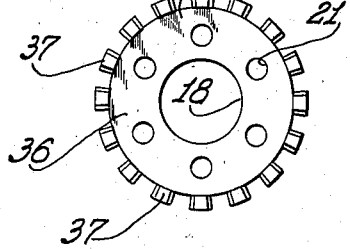
INVENTOR.
Ole Jensen
BY Rasmussen and Bregman
ATTORNEYS.

Patented Nov. 25, 1941

2,264,178

UNITED STATES PATENT OFFICE 2,264,178

VARIABLE SPEED DEVICE

Ole Jensen, Chicago, Ill.

Original application January 21, 1939, Serial No. 252,078. Divided and this application September 13, 1939, Serial No. 294,598

1 Claim. (Cl. 74—230.17)

This invention relates in general to variable speed devices, and more particularly to variable speed devices composed of sheet metal or any other suitable material. This application is a division of my co-pending application, Serial No. 252,078, filed January 21, 1939.

A principal object of the invention is the provision of a wheel having opposed, recessed, sloping side surfaces which converge at the outer periphery of the wheels, so that two or more such wheels may be co-axially mounted to enable the same to be moved axially into and out of interengaging or nested relationship relative to each other.

A further important object of the invention is the provision in such a variable speed device of novel hub mechanism which functions not only to mount the wheels in desired manner on a shaft, or the like, but also to rigidly retain the inner portion of the sheet metal part of the wheel in place.

Numerous other objects and advantages of the invention will be apparent as it is better understood from the following description, which, when taken in connection with the accompanying drawings, discloses a preferred embodiment thereof.

In the drawings,

Figure 3 is a plan view of a sheet metal blank used in making one of the wheels of the unit of Figs. 1 and 2;

Figure 4 is a plan view of the blank of Fig. 3 after it has been bent to form the body portion of a wheel;

Figure 5 is an exploded plan view of the two members comprising the hub portion of a wheel; and Figure 6 is an end elevational view of one of the hub members taken substantially on the line 6—6 of Fig. 5.

Figure 1:
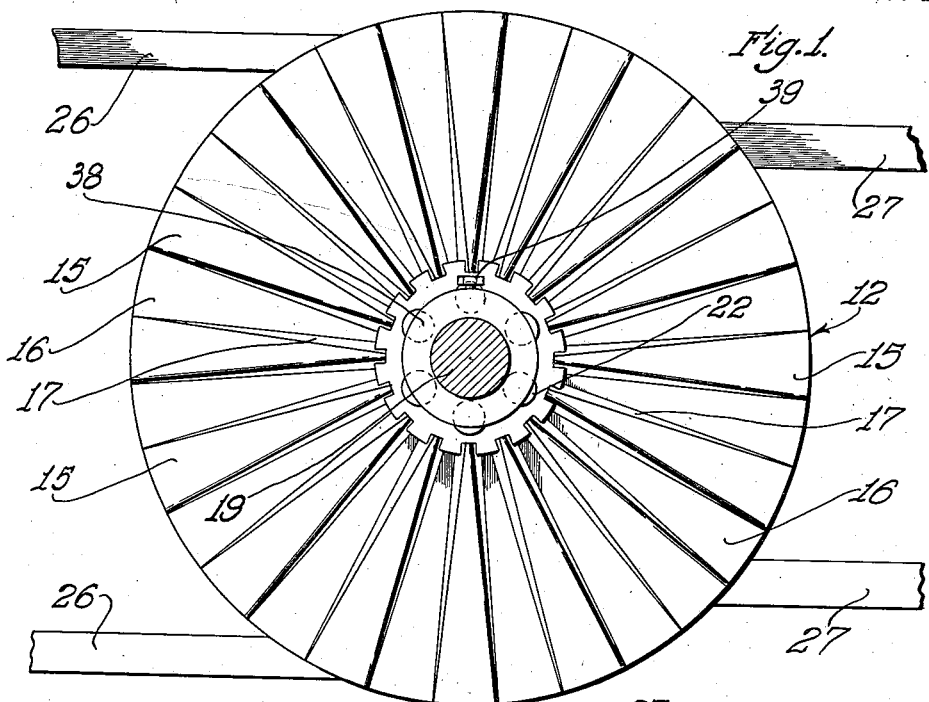
Figure 1 is an end elevational view of a driving unit comprising a plurality of wheels embodying the features of the instant invention mounted in sliding relationship to each other upon a shaft which is shown in section.
Figure 2:
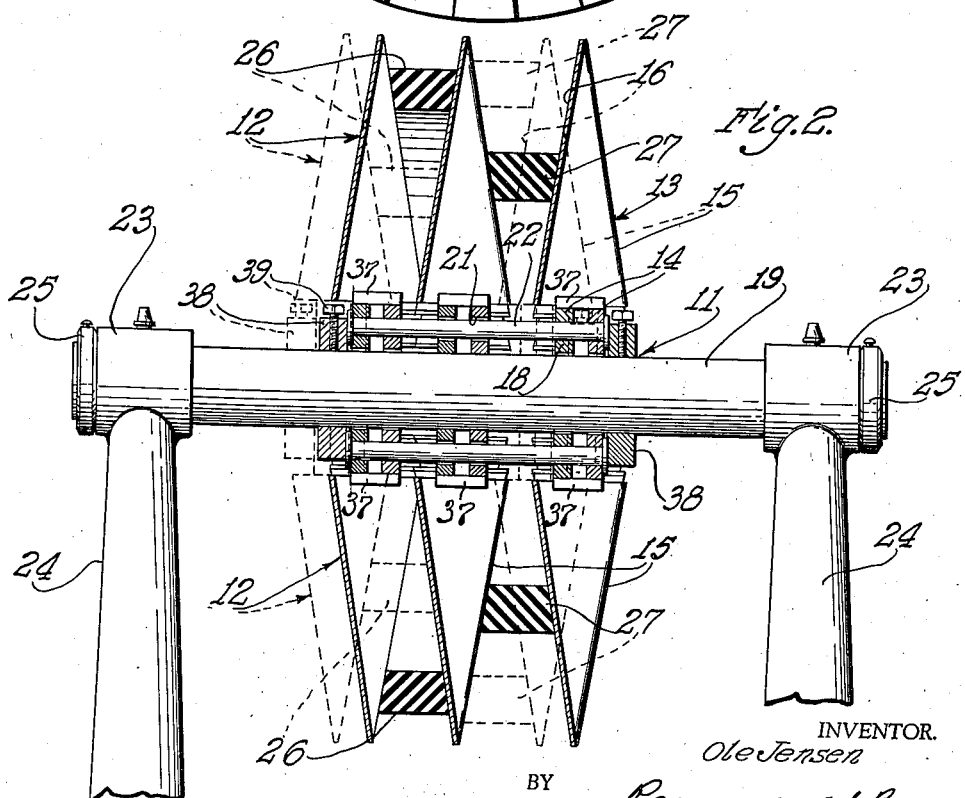
Figure 2 is a vertical section of the unit of Fig. 1 taken longitudinally of the shaft, and illustrating the relative movement of the wheels in dotted outline.

Referring more particularly to Figs. 1 and 2 of the drawings, reference numeral 11 indicates in general a variable speed device which comprises a plurality of wheel members, each indicated generally by reference numeral 12. Each of the wheel members 12 is made up of a main portion 13 and a pair of hub members 14. The main portion 13 is formed in a manner to be later more fully described from a sheet of any suitable material, such as sheet metal or the like, to provide a plurality of substantially segment-shaped lateral bearing surfaces 15 and 16. The outer ends of the segmental portions 15 and 16 terminate in the same plane, and from this plane, the portions 15 and 16 slope or extend outwardly on opposite sides to provide two opposed bearing surfaces. Each bearing surface 15 is directly connected to its adjacent bearing surface 16 by a triangularly shaped web portion 17 which is disposed at a slightly obtuse angle to the planes of each of the two bearing surfaces 15 and 16.

In this manner, a pair of opposed bearing surfaces are provided by the main portion 13 of each wheel 12 which converge at their outer ends and are each made up of a plurality of substantially segment-shaped portions spaced from each other by substantially segment-shaped recesses which substantially coincide with, and are slightly larger than, the segment-shaped portions of the opposed bearing surface.

The hub members 14 are secured to the inner ends of the web portions 17 in a manner to be later more fully described, and are each provided with a bore or centrally disposed aperture 18. The several wheels 12 of the unit 11 (shown as three in number in Fig. 2), are each mounted upon a cross shaft 19, the two outer wheels being slidably mounted thereon, while the center wheel has its hub members 14 rigidly secured to the shaft 19. The hub members 14 of each of the wheels 12 are also provided with a plurality of circumferentially spaced apertures 21 through which a series of rods 22 extend (Fig. 2). Each rod 22 is rigidly secured in any suitable manner to the hub members 14 of the outer two wheels 12. The apertures 21 in the hub members 14 of the central wheel 12 are slightly larger than those of the other hub members, so that the rods 22 are readily slidable through the apertures 21 of the central wheel 12. With this arrangement, the two outer wheels 12 may be moved longitudinally of the shaft 19 as a unit relative to the central wheel 12.

In such relative movement between the several wheel members, the bearing segment portions 15 or 16 of one wheel will be moved into and out of the recesses in the adjacent bearing surface of the adjacent wheel to form a variable speed device or adjustable pulley. To facilitate such intermeshing or nesting of adjacent wheels 12, the hub member 14 of each wheel is made much narrower than the base part of the main portion 13 of the wheel, as shown in Fig. 2. Thus the adjacent wheels 12 may be moved toward each other an appreciable distance, or until the hub members 14 thereof come into contact with each other.

The shaft 19 may be mounted in any suitable manner, but it is preferred that it be rotatably journaled in bearing portions 23 provided at the upper ends of levers or brackets 24, as shown in Fig. 2. In order to prevent longitudinal movement of the shaft 19, any suitable means, such as collars 25, may be secured to the outer ends of the shaft 19. The two bracket members 24 are preferably mounted so as to be swingable together as a unit to move the shaft 19 crosswise thereof, or forward and backward viewing Fig. 2.

The unit 11 above-described is adapted to be used as a change speed gear mechanism. In such use, a belt 26 of any suitable material and having a trapezoidal cross sectional shape is mounted between the left hand (Fig. 2) and central wheels 12, and extends therefrom around a suitable driving member. A similar belt 27 is positioned between the right hand (Fig. 2) and central wheels 12, and around a suitable driven member (not shown).

With this arrangement and the mounting of the shaft 19 as above described, forward movement, viewing Fig. 2, (movement to the left in Fig. 1), of the shaft 19 will result in increasing the effective length of the belt 27 in the same proportionate amount. If such movement be imparted to the shaft 19, through the agency of the rockable bracket 24, while the belt 26 is moving to impart motion to the unit 11 and belt 27, the two outer wheels 12 will be moved to the right, viewing Fig. 2, relative to the central wheel 12 to decrease the distance between the left wheel and the central wheel and to increase the distance between the central wheel and the right wheel. This will result in the driven belt 27 being actuated at a decreased linear speed relative to that at which it had previously been driven.

Conversely, rearward movement of the shaft 19, viewing Fig. 2, or movement thereof to the right, viewing Fig. 1, will result in the distance between the left wheel 12 and the central wheel 12 being increased with a corresponding decrease in the distance between the central wheel and the right wheel 12, as shown by dotted outlines in Fig. 2. This will function to increase the linear speed of the driven belt 27. It will thus be seen that any swinging movement which is imparted to the shaft 19 by the brackets 24 will result in a change of driving ratio between the belts 26 and 27.

If it is desired to retain the outer wheels 12 in any predetermined or set position on the shaft 19 relative to the central wheel 12, a pair of collar members 38 may be slidably mounted on the shaft. Each of the collars 38 may be provided with a set screw 39 which is adapted to retain the same in set position. It will be understood, of course, that in the operation of the unit 11 as above described, the collars 38 will not be used.

The outstanding advantage of the unit 11 above described is to be found in the fact that the wheels 12 are so constructed as to facilitate a relatively wide range of movement between the outer wheels and the central wheel. This highly desirable condition is made possible only by the fact that the wheels 12 are so constructed as to permit very close intermeshing or nesting together thereof. Such construction is obtained by making the main portion 13 of the wheels 12 from relatively thin sheet metal. For example, if these main portions 13 of the wheels 12 were made from cast metal, it would be impossible to so construct them as to permit any appreciable intermeshing thereof, where it is desired that such intermeshing take place on both sides of any given wheel (such as the central wheel 12 in Fig. 2).

Consequently, the particular construction of each of the wheels 12 herein disclosed is of primary importance. For this reason, the method of making the wheels 12 is considered to be an outstanding feature of the instant invention. The preferred method of making one of the wheels 12 is as follows:

The main portion 13 of the wheel 12 is preferably bent or formed from an annular blank of sheet metal 28 (Fig. 3) in one continuous step or operation. The inner diameter of the blank 28 is equal to the outer diameter of the finish portion 13 of the wheel 12. The blank 28 is bent along the broken lines shown in Fig. 3 and inwardly upon itself, so that the outer periphery of the blank comprises the inner edges of the several segment-shaped bearing portions 15 and 16 and the web portions 17 of the main portion 13 of the wheel in its final form.

To more fully explain this bending step, the inner periphery of the blank 28 is designated by reference numeral 29. In Fig. 4, which shows the blank after the bending operation has been performed thereon, it will be seen that the edge portion 29 thereof now constitutes the outer periphery. The inner edge of the main portion 13 of the wheel, after this bending operation has been performed, is corrugated, viewing Fig. 4, and is divided successively into a plurality of series or groups of edge portions, each comprising a relatively short edge portion 31, a relatively long edge portion 32, an edge portion 33 of substantially the same length as the portion 31, and an edge portion 34 of substantially the same length as the portion 32. In the final form of the main part 13 of the wheel 12, the edge portions 31 constitute the inner ends of the segment-shaped bearing portions 15, while the edge portions 33 constitute the inner ends of the bearing portions 16 forming the opposite bearing surface of the wheel. Similarly, the edge portions 32 and 34 constitute the inner ends of the segment-shaped webs 17. These edge portions 31 to 34 are shown in Fig. 3 as making up the outer periphery 35 of the blank 28.

It will now be better appreciated that the broken lines shown on the blank 28 in Fig. 3 are the lines upon which the blank is folded or bent in the forming of the main portion 13 of the wheels 12. To further aid in visualizing this bending operation, the several portions of the blank 28 which eventually go into the making up of the separate segment-shaped portions of the final product are indicated by the corresponding reference numerals 15, 16, and 17 in Fig. 3. Due to the natural resiliency of the sheet metal forming the blank 28, in its final form, as shown in Fig. 4, after the bending operation above described has been performed, the inner portion thereof will be flexed to one side or the other of the outer periphery 29.

The hub members 14 thus perform the two functions of retaining the inner part of the main portion 13 centrally disposed relative to the outer periphery 29, and of providing convenient means for mounting the wheel 12 in any desired manner. Referring more particularly to Figs. 5 and 6, it will be seen that each of the hub portions 14 is similar to the other, and that each comprises a web portion 36 which terminates at its outer periphery in a plurality of circumferentially spaced lugs 37. Each of the lugs 37 extends laterally beyond one face of the web portion 36, and the radial side surfaces thereof slope or taper in such direction, so that the protruding end of the lug is narrower than the other end. The spacing between adjacent lugs 37 is such that, when the two associated hub members 14 are moved together from their position of Fig. 5 to their assembled position of Fig. 2, the lugs 37 of the two hub members will intermesh, with spaces being provided therebetween of substantially the same width as the thickness of metal used to form the main portion 13 of the wheel.

Thus, to assemble the two members 14 and the main portion 13 of the wheel, the inner part of the portion 13 is sprung inwardly from its position of Fig. 4 to its central position of Fig. 2, and the two hub members 14 are engaged therewith from opposite sides thereof. It will be noted from Fig. 2 that the outer diameter of the web portion 36 of the hub members 14 is slightly less than the inner diameter of the main portion 13. In this assembled position, the inner edges 32, 34 of the segment-shaped web portions 17 are clamped between the adjacent radial surfaces of the lugs 37. The parts may be retained in this assembled position in any suitable manner, such as by upsetting the edge portions of the outer surfaces of the lugs 37, or welding the hub members 14 to the segment-shaped webs 17 of the main portion 13. It will be noted in Fig. 6 that the web portion 36 of the hub member 14 is that part of the member in which the bore 18 and the apertures 21 are formed.

The method of making the wheels 12 above described permits of sheet metal being used for the main part 13 of the wheel without any undue strains or stress being set up in the metal during the bending operation to which it is subjected. At the same time, the hub members 14 function to rigidly retain the main part 13 of the wheel in final shape, while providing an excellent bearing means for mounting the wheel in any desired manner. It will be appreciated that the use of sheet metal in forming the main part 13 of the wheel 12 permits of many uses of the wheel to which it would not be put if it were formed by a casting operation. The resulting light weight of the structure also has material advantages which are not enjoyed by a cast pulley.

It is thought that the invention and many of its attendant advantages will be understood from the foregoing description, and it will be apparent that various changes may be made in the form, construction and arrangement of the devices mentioned herein and in the steps and their order of accomplishment of the process described, without departing from the spirit and scope of the invention or sacrificing all of its material advantages, the forms and processes hereinbefore described being merely a preferred embodiment thereof.

I claim:

In a variable speed device, a pair of pulley sections, each section comprising a main part of sheet metal formed to provide opposed, sloping bearing surfaces converging at the outer periphery thereof, each of said surfaces comprising alternate bearing portions and recesses, with the recesses of each surface substantially coinciding with and slightly larger, in the plane of the periphery, than the bearing portions of the other surface, and web portions formed integrally with and joining adjacent bearing portions of said opposed surfaces, and a separate hub portion, comprising a pair of similar members each having a radially extending web portion terminating at its outer periphery in a plurality of laterally extending, circumferentially spaced lugs, said lugs being interengaged with each other and engaging the web portions of said main part therebetween, to rigidly secure the latter and said hub portion together.

OLE JENSEN.